(12) United States Patent
Haddad

(10) Patent No.: US 11,356,551 B2
(45) Date of Patent: Jun. 7, 2022

(54) ACTIVE AUDIO CALLING DEVICE IDENTIFICATION SYSTEM

(71) Applicant: SecureLogix Corporation, San Antonio, TX (US)

(72) Inventor: Waleed S. Haddad, San Francisco, CA (US)

(73) Assignee: SecureLogix Corporation, San Antonio, TX (US)

( * ) Notice: Subject to any disclaimer, the term of this patent is extended or adjusted under 35 U.S.C. 154(b) by 0 days.

(21) Appl. No.: 17/252,392

(22) PCT Filed: Jun. 19, 2019

(86) PCT No.: PCT/US2019/037930
§ 371 (c)(1),
(2) Date: Dec. 15, 2020

(87) PCT Pub. No.: WO2019/246219
PCT Pub. Date: Dec. 26, 2019

(65) Prior Publication Data
US 2021/0258422 A1    Aug. 19, 2021

Related U.S. Application Data

(60) Provisional application No. 62/686,951, filed on Jun. 19, 2018.

(51) Int. Cl.
*H04M 3/42* (2006.01)
*H04M 3/436* (2006.01)
*H04M 3/51* (2006.01)

(52) U.S. Cl.
CPC ....... *H04M 3/42051* (2013.01); *H04M 3/436* (2013.01); *H04M 3/5183* (2013.01); *H04M 2203/6045* (2013.01)

(58) Field of Classification Search
CPC ............ H04M 3/42051; H04M 3/436; H04M 3/5183; H04M 2203/6045
(Continued)

(56) References Cited

U.S. PATENT DOCUMENTS 6,226,372 B1    5/2001    Beebe et al.
6,249,575 B1    6/2001    Heilmann et al.
(Continued)

FOREIGN PATENT DOCUMENTS

EP    3516652 A1    7/2019
WO    2018053518 A1    3/2018
(Continued)

*Primary Examiner* — Ahmad F. Matar
*Assistant Examiner* — Jirapon Intavong
(74) *Attorney, Agent, or Firm* — William H. Quirk; Alexander J. Antonio; Rosenthal Pauerstein Sandoloski Agather, LLP

(57) ABSTRACT

A system for identifying the calling device used to place a call in to an enterprise call center. The system also provides information about the network path through which the call was delivered. The system uses active "pinging" in the audio channel during the first few seconds of the call. The device of the invention sends a special sequence of audio tones from the callee to the caller over the audio channel. The system then records and analyses the resulting incoming audio and compares them with the original tones. The system uses that information to characterize the calling device, and possibly the network path as well. The system checks this information against previously stored information from a known valid caller to aid in verifying the identity of the caller, or to flag the call for further assessment via other methods.

14 Claims, 11 Drawing Sheets

(58) Field of Classification Search
USPC .......................................................... 455/415
See application file for complete search history.

(56) References Cited

U.S. PATENT DOCUMENTS

| | | |
|---|---|---|
| 6,320,948 B1 | 11/2001 | Heilmann et al. |
| 6,687,353 B1 | 2/2004 | Brysch et al. |
| 6,700,964 B2 | 3/2004 | Schmid et al. |
| 6,718,024 B1 | 4/2004 | Heilmann et al. |
| 6,735,291 B1 | 5/2004 | Schmid et al. |
| 6,760,420 B2 | 7/2004 | Heilmann et al. |
| 6,760,421 B2 | 7/2004 | Heilmann et al. |
| 6,879,671 B2 | 4/2005 | Schmid et al. |
| 7,133,511 B2 | 11/2006 | Buntin et al. |
| 7,231,027 B2 | 6/2007 | Schmid et al. |
| 7,440,558 B2 | 10/2008 | Heilmann et al. |
| 8,150,013 B2 | 4/2012 | Buntin et al. |
| 8,238,532 B1 | 8/2012 | Cox et al. |
| 9,001,985 B2 | 4/2015 | Cox et al. |
| 9,762,728 B1 | 9/2017 | Cox et al. |
| 9,824,692 B1 | 11/2017 | Khoury et al. |
| 9,871,913 B1 | 1/2018 | Saitawdekar et al. |
| 10,325,601 B2 | 6/2019 | Khoury et al. |
| 10,547,739 B2 | 1/2020 | Cody et al. |
| 10,553,218 B2 | 2/2020 | Khoury et al. |
| 10,623,403 B1 | 4/2020 | Gupta et al. |
| 10,665,244 B1 | 5/2020 | Gupta et al. |
| 10,666,792 B1 | 5/2020 | Marzuoli et al. |
| 10,672,403 B2 | 6/2020 | Khoury et al. |
| 10,685,008 B1 | 6/2020 | Kurve et al. |
| 10,693,840 B2 | 6/2020 | Peterson et al. |
| 10,854,205 B2 | 12/2020 | Khoury et al. |
| 10,873,461 B2 | 12/2020 | Gupta et al. |
| 2007/0121596 A1* | 5/2007 | Kurapati ............ H04L 29/06027 370/356 |
| 2011/0026699 A1* | 2/2011 | Amir .................... H04M 15/06 379/142.05 |
| 2014/0241513 A1* | 8/2014 | Springer ............... H04M 3/493 379/88.01 |
| 2019/0392842 A1 | 12/2019 | Khoury et al. |
| 2020/0294510 A1 | 9/2020 | Khoury et al. |
| 2020/0302939 A1 | 9/2020 | Khoury et al. |
| 2021/0082439 A1 | 3/2021 | Khoury et al. |
| 2021/0110813 A1 | 4/2021 | Khoury et al. |
| 2021/0233541 A1 | 7/2021 | Chen et al. |
| 2021/0241776 A1 | 8/2021 | Sivaraman et al. |
| 2021/0280171 A1 | 9/2021 | Phatak et al. |
| 2021/0326421 A1 | 10/2021 | Khoury et al. |

FOREIGN PATENT DOCUMENTS

| | | |
|---|---|---|
| WO | 2018053537 A1 | 3/2018 |
| WO | 2019014425 A1 | 1/2019 |
| WO | 2019182724 A1 | 9/2019 |
| WO | 2019182725 A1 | 9/2019 |
| WO | 2021072109 A1 | 4/2021 |
| WO | 2021154600 A1 | 8/2021 |
| WO | 2021178675 A1 | 9/2021 |
| WO | 2021211836 A1 | 10/2021 |

* cited by examiner

ACTIVE AUDIO CALLING DEVICE IDENTIFICATION SYSTEM

CLAIM OF PRIORITY TO PRIOR APPLICATION

This application claims the benefit of the filing date of U.S. Provisional Application Ser. No. 62/686,951, filed on Jun. 19, 2018, the entire disclosure of which is hereby incorporated by reference in its entirety into the present disclosure.

BACKGROUND OF THE INVENTION

1. Field of the Invention

The present invention primarily relates to systems and methods for identifying and authenticating the calling device used to place a call, particularly to calls to an enterprise call center. The disclosed systems and methods may also provide information about the network path through which the call was delivered. This is important for both security and efficiency in handling incoming calls.

2. Description of Related Art

Many enterprises, such as banks, have a need to validate and authenticate the identity of a caller who is placing a telephone call in to their system. This is important for both security reasons and for improving the efficiency in handling and routing calls. Companies have been looking for reliable and efficient systems to route users with a high likelihood of being fraudulent to specially trained operatives, increasing the efficiency of their call centers while simultaneously decreasing the amount of fraud.

Traditionally, there are four categories of authentication methods, each carrying its own properties, exploits, and problems. The categories are knowledge-based (for example, what the user knows like a PIN number), token-based (for example, what the user has, such as a magnetic card), a combination knowledge and token based (for example, like an ATM requiring a card and a PIN), and biometric (for example, something unique to the user, like a fingerprint).

Due to technology proliferation, it has become increasingly easy to overcome existing authentication methods, which often rely on properties that can be easily broken. Additionally, when authentication systems require more user interaction, the more likely users will balk at the increase in costs in time and money to the user. Authenticating users is becoming more important as applications and services can no longer rely on authenticating the user using traditional methods alone.

This is a long-standing problem and a lot of work has been done in this area to date. However, no current solution is perfect and there is still a need for new technology to be developed to help enterprises authenticate callers. For these reasons, there is a substantial need for improvement in the response systems currently used in authentication of users and/or calling devices, without increasing the complexity and cost to the users. In order to balance these interests, there is a long-felt need in the art for authentication systems that are simpler and less expensive to implement and use, while providing improved authentication.

SUMMARY OF THE INVENTION

To this end, the disclosed systems and methods use active "pinging" in the audio channel during the beginning of a phone call. The goal is to characterize the calling device and the network through which the call is passing through. The system sends a special sequence of tones (pings) from the receiver's end to the caller via the outgoing audio channel and listens for any portion of that audio that gets returned through the incoming audio channel. The returned audio is then analyzed and compared with the sent audio, and that information is used to create a "PingerPrint" (i.e., a "fingerprint" unique to the calling device) of the calling device, and possibly the network as well, that can then be checked against a stored, secure database on the enterprise (receiver's) system.

The system sends pings during the very early stage of the call and does not require user interaction. Some enterprise call response systems actually pick up the call immediately, then play an artificial ring tone for several seconds, letting the caller think that the call has not yet been picked up. During this time, the system queries commercial authentication services, which determines if the call is likely to be coming from the calling number in the caller ID. Instead of playing a standard ring tone during this time, the pings are played, over a different ring tone (in some embodiments), or some other message to the caller (in alternate embodiments). The returned portion of the pings are collected at this time, and the information is processed before the call is transferred into the enterprise call response system. The system uses the results to route the call properly.

One use case for the disclosed system and methods is that in which an enterprise has a group of registered users who call in to the system repeatedly, and there is a need to authenticate these callers to prevent unauthorized access to the system. In this case, enrollment in the system may be required. This may preferably be done using a passive enrollment method that does not require users calling in to the system to explicitly take action to register or enroll in the system. Enrollment can be done automatically the first time a user calls in, and enrollment can also be updated automatically in the future if a user changes his/her calling device or other changes are made. Passive enrollment will help maintain a positive user experience, and this is importance especially in commercial applications of the disclosed technology.

A challenge in authenticating the caller's device comes from the fact that the same enrolled caller may use different devices to call, such as a mobile phone versus a landline, for example. In addition, that same caller may use different calling modes of the same device when calling. For example, a mobile phone user may call with the calling device in hand, held to his/her ear, or may use earbuds, or perhaps speakerphone mode. All of these different modes are likely to cause variations in the authentication results. While this presents a challenge, this also provides useful information. One planned approach for dealing with different devices and modes for the same caller is to have multiple enrollments for the same caller. With passive enrollment, this likely will not negatively impact the user experience of the caller.

In contrast to enrollment in to the system, the disclosed system and methods may also be useful in cases in which no enrollment has taken place, and this represents another use case. The technology can, and most likely will, be used in conjunction with other voice security technologies to build up a more robust security system. In this case, use of the system without enrollment can still play an important role, again because it collects new information that is not available through any other voice security technology.

Many other objects, features, advantages, benefits, improvements and non-obvious unique aspects of the disclosed embodiments, as well as the prior problems, obstacles, limitations and challenges that are addressed, will be evident to the reader who is skilled in the art, particularly when this application is considered in light of the prior art. It is intended that such objects, features, advantages, benefits, improvements and non-obvious unique aspects are within the scope of the present invention, the scope of which is limited only by the claims of this and any related patent applications and any amendments thereto.

To the accomplishment of all the above, it should be recognized that this invention may be embodied in the forms illustrated in the accompanying drawings, attention being called to the fact, however, that the drawings are illustrative only, and that changes may be made in the specifics illustrated or described.

BRIEF DESCRIPTION OF THE DRAWINGS

For a more complete understanding of the present invention and its embodiments, and the advantages thereof, reference is now made to the following descriptions taken in conjunction with the accompanying drawings, in which.

DETAILED DESCRIPTION OF ILLUSTRATIVE EMBODIMENTS

The following examples are included to demonstrate preferred and alternative embodiments. It should be appreciated by those of ordinary skill in the art that the techniques disclosed in these examples are thought to represent techniques that function well in the practice of various embodiments, and thus can be considered to constitute preferred modes for their practice. However, in light of the present disclosure, those of ordinary skill in the art should appreciate that many changes can be made in the specific embodiments which are disclosed while still obtaining a like or similar result without departing from the spirit and scope of the invention.

For purposes of these descriptions, a few wording simplifications should also be understood as universal, except to the extent otherwise clarified in a particular context either in the specification or in any claims. The use of the term "or" in the specification is used to mean "and/or" unless explicitly indicated to refer to alternatives only, or unless the alternatives are inherently mutually exclusive. When referencing values, the term "about" is used to indicate an approximate value that includes the standard deviation of error for any particular embodiments that are disclosed or that are commonly used for determining such value. "A" or "an" may mean one or more, unless clearly indicated otherwise. Such "one or more" meanings are most especially intended when references are made in conjunction with open-ended words such as "having," "comprising," or "including."

Figure 1A:
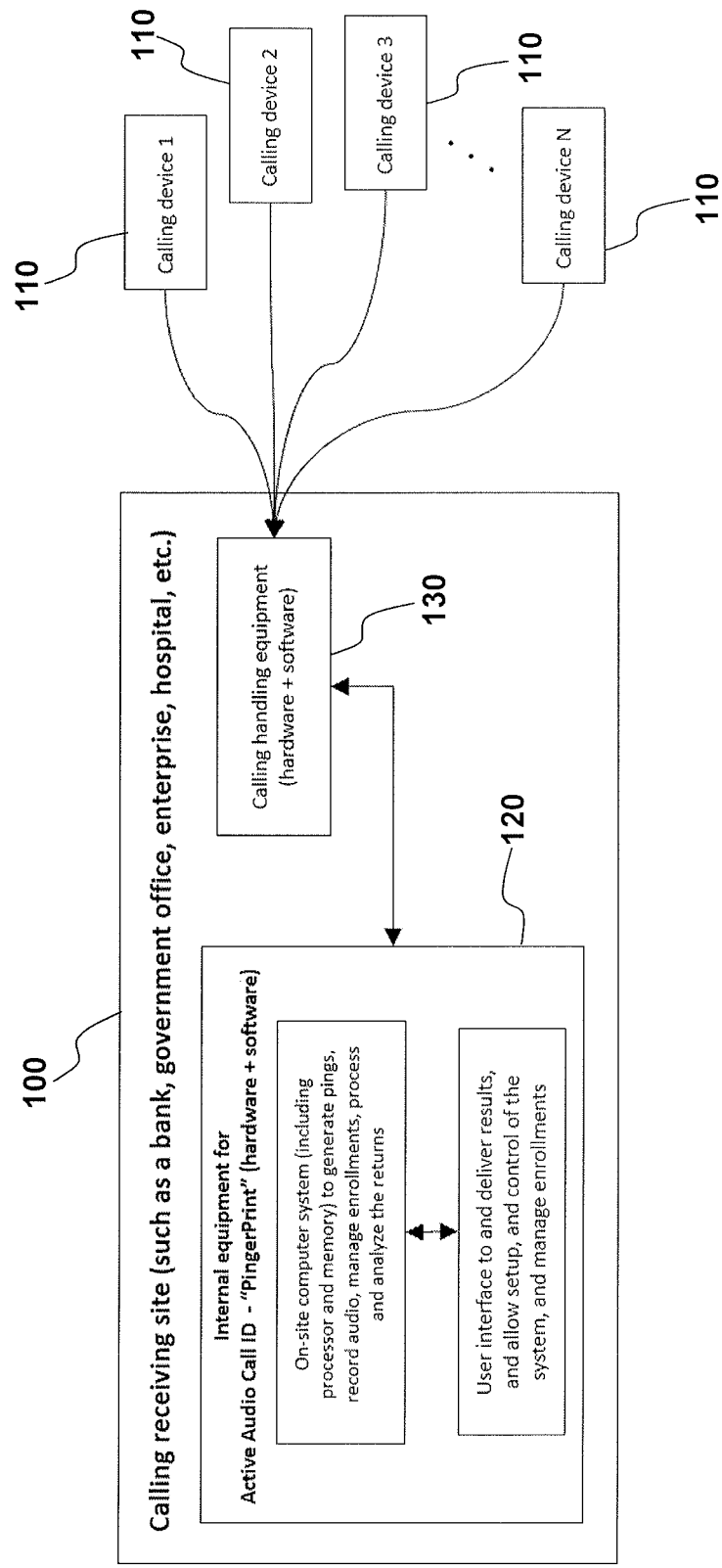
FIG. 1A & FIG. 1B are schematic representations of embodiments of the disclosed system.

In one embodiment 10 shown in FIG. 1, a calling device 110 (shown as multiple calling devices 1-N) and a receiving entity 100 are shown. The receiving entity 100 is shown to include an enterprise call response system 120 ("response system"), as well as call handling equipment 130. Call handling equipment 130 may include, but not be limited to, a Private Branch Exchange (PBX) system, a Session Border Controller (SBC), a Gigamon, a call audio recording system, an Interactive Voice Response (IVR) system, and any other call handling equipment that is capable of receiving and/or transferring calls as necessary according to the disclosed methods for authentication of a calling device. Response system 120 is shown to include an on-site computer system (with hardware and software components) and a user interface that is adapted to enable a user to setup and control the response system 120, manage enrollments, and to deliver the results of the call authentication process.

The call handling equipment 130 is set up to receive incoming calls and is configured to forward the incoming call information to response system 120. Response system 120 is configured to generate and send the ping(s), and record the audio returns in real time. The response system 120 takes the audio and processes the information in real time (usually as fast as possible during the call) in order to make a decision about the authenticity of the caller as early in the call as possible, perhaps even before the call is taken into the Interactive Voice Response (IVR) system or by an agent. Response system 120 is preferably maintained in a server, although this is not required.

Figure 1B:
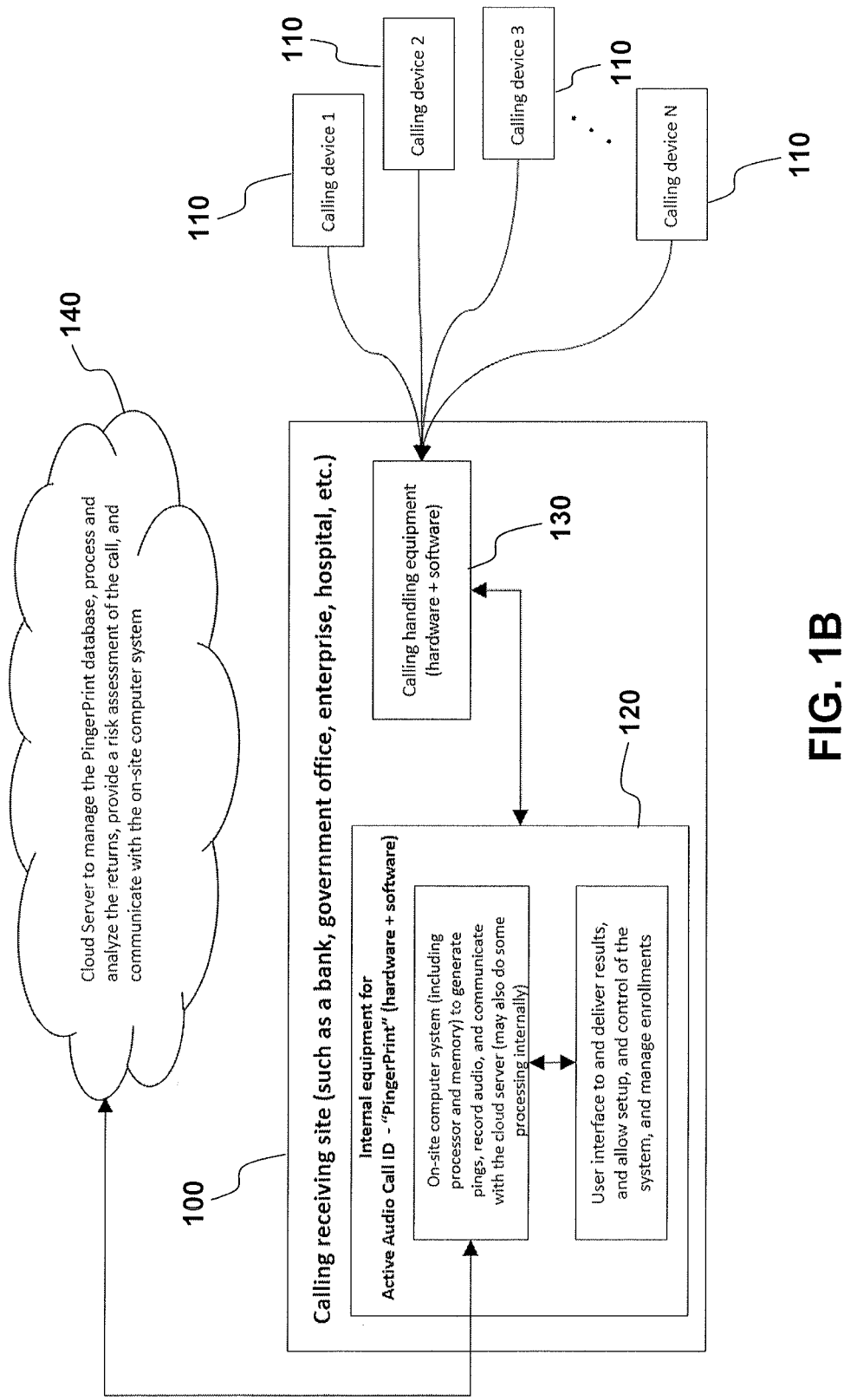

Turning to FIG. 1B, there is shown another embodiment of the response system 120 and related components. The main difference between the embodiment illustrated in FIG. 1A and the embodiment illustrated in FIG. 1B is that some of the response system is cloud-hosted separately from the enterprise call center 100, as shown in FIG. 1B. For instance, the on-site computer system component of the response system 120 generates the pings and records the audio returns. In the cloud-hosted portion of response system 120, there is a database, and the cloud-hosted portion processes and analyzed the recorded returns, provides a risk assessment of the call being authenticated, and is configured to communicate any or all of this information to the on-site computer system.

In an alternate embodiment, when a call comes in to the response system 120 it plays an audio WAV file which has been uploaded for use as an outgoing "message" to the caller. The pings are incorporated into this outgoing message file. In some embodiments, the pings are generated in real time by the incoming call routing system. All incoming and outgoing audio during the call can be recorded as a TCP dump. The captured data is then analyzed offline and observations from the analysis are used to modify the design of the outgoing pings with the goal of optimizing the robustness, and value for authentication of the method.

In some embodiments, the response system 120 creates and selects the optimal ping tones by first creating various outgoing audio files with a series of different types of ping tones. These may include single-frequency bursts with different time envelopes, upward or downward chirps of various durations, either linear or logarithmic, bursts of more complex waveforms of different durations and time envelope shapes, etc. These different types of pings are designed to provide informative test results that will lead to optimization of the pings to be used in a product implementation.

Echo cancelling technology is now ubiquitous (or nearly so) in telephone networks and can affect the ping results. In some embodiments the response system 120 turns off echo cancellation for a particular call by playing one or more special tones on the line at the outset of the call. The tones are those used by fax machines and dialup modems. They are called the "ANS" and "CNG" tones. As is known in the art the ANS tone is the critical one to play in order to affect echo cancelation, so in some embodiments the outgoing audio ping files include an ANS tone that is played at the very beginning. This ANS tone is spec'd at 2100 Hz, with phase shifts of 180 degrees every 450 milliseconds (ms). Playing this ANS tone has a very definite effect on the pings that get returned, and in general, it improves the strength and number of the returned pings, as expected under the assumption that it has disabled echo cancelation. In some embodiments, the response system 120 determines in tests with the ANS tone whether or not echo cancellation is actually being turned off and optimizes the ping tone to maximize quality. In some embodiments, the response system 120 uses ping envelop shapes that can get past any echo cancelation in the network.

A wide range of different ping tones has been tested and the range of useful tones is being narrowed down. In some embodiments, the response system 120 will test which pings work the best during a period of initialization ("initialization phase"). In one embodiment 10, rising chirps work much better than falling chirps. Most of the test tones have been bursts of varying lengths ranging between 5 ms and 150 ms, with frequencies of between 60 Hz and 4 kHz. The max frequency of 4 kHz was chosen because the sample rate used in the phone network is 8 kHz, however it quickly became clear that the 4 kHz tones were not getting through well at all, so now a frequency ceiling of 2 kHz is typically observed.

The goal of the initialization phase and the testing is to create "fingerprints" or "characterization" of a calling device 110, including the network, to provide useful information as part of the response system 120 that can authenticate a caller. Using the active probing by means of audio pings, the response system 120 creates this "FingerPrint" by numerical analysis of the returns from the pings, and how they compare with what was sent out.

There are at least two embodiments of this characterization. One embodiment 20 involves authenticating enrolled users. This requires callers to be enrolled into an enterprise system, such as a bank's customer databases. Enrollment with this technology is totally passive, which is important for a positive user experience. The caller does not have to actively do anything to enroll. The enrollment happens automatically when new users call in. The response system 120 automatically updates the enrollment information when a user changes his/her device, moves to a new location or telephone system, or the phone network changes. The response system 120 compiles and maintains multiple enrollment PingerPrints for each user to cover multiple devices (such as a cell, landline, office phone, etc.). Multiple enrollments may also be required to cover the use of earbuds or speakerphone mode, which can change the ping returns. When an enrolled caller calls in again, the response system 120 authenticates his/her device by comparing the returned data with that stored in the response system 120's database by matching and validating the device type or network against service provider records.

Figure 2:
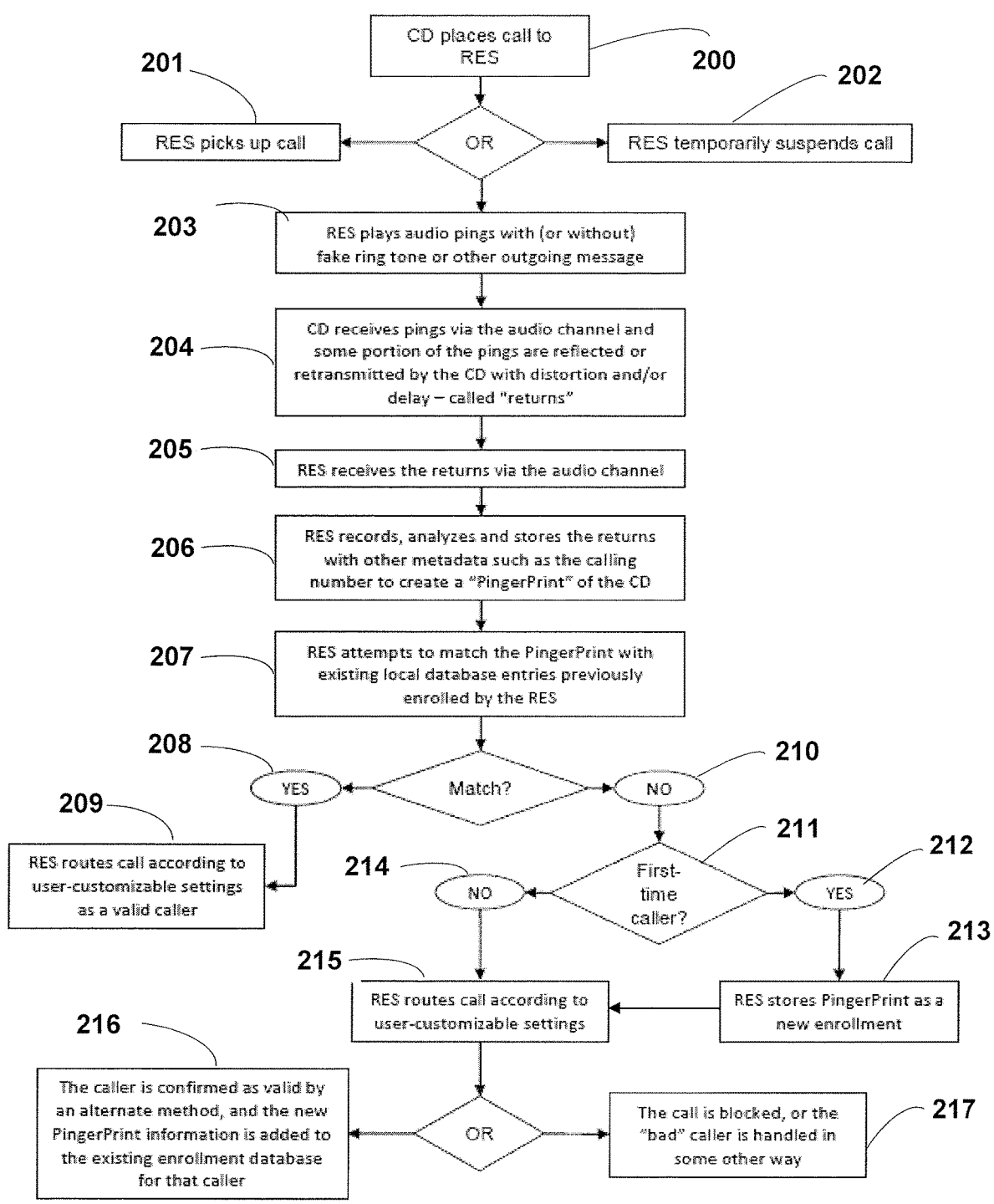
FIG. 2 is a flow diagram depicting a method for authenticating a call with enrollment in an enterprise system.

Turning to FIG. 2, there is shown a flow diagram of an authentication process with enrollment 20. In step 200, a calling device 110 places a call to a receiving entity's system, referred to as an enterprise call response system ("response system 120"). In the next step, the response system will either pick up the call (201), temporarily suspend the call (202), or play audio pings with (or without) a fake ring tone or other outgoing message (203). If the response system plays audio pings (203), in the next step 204 the calling device 110 receives pings via the audio channel and some portion of the pings is passively reflected or retransmitted by the calling device 110 with distortion and/or a delay. In other words, nothing has to be done to or with calling device 110 in order for the portion of the pings to be reflected or retransmitted to the response system 120. The user of calling device 110 does not need to perform any affirmative step, and no special application or hardware needs to be added or installed on the calling device 110 in order for the portion of the pings to be reflected or retransmitted to the response system 120. The portion of the pings that is reflected or retransmitted by the calling device 110 with distortion and/or a delay is called "returns." In step 205, the response system receives the returns via the audio channel. In step 206, the response system records, analyzes, and stores the returns with other metadata such as the calling number, in order to create a "PingerPrint" of the calling device 110.

In step 207, the response system attempts to match the PingerPrint with existing local database entries previously enrolled by the response system. If the response system finds a match (208), in step 209 the response system routes the call according to user-customizable settings as a valid caller. If the response system does not find a match (210), the response system determines if the calling device 110 is a first time caller (211). If it is a first time caller (212), in step 213 the response system stores the PingerPrint as a new enrollment. Storage of the new enrollment may be accomplished automatically by response system 120 once it is determined that the PingerPrint does not match any pre-existing database entries. Alternatively, storage of the new PingerPrint as a new enrollment may require intervention from a call-taking agent in order to complete the storage process. If it is not a first time caller (214), in step 215 the response system routes the call according to user-customizable settings. Then, one of two possible steps will occur. In step 216, the response system confirms the caller as valid by an alternate method, and the new PingerPrint information is added to the existing enrollment database for that caller. In the alternative step 217, the response system blocks the call, or the "bad" caller is handled in some other way. For example, an organization employing response system 120, upon determination that a call is a "bad" call, rather than blocking the call might reroute that call to a special call-taking agent, the organizations fraud department, to voicemail, or some other special IVR system. One important reason to send such a call to a special live agent is to have a human determine if the caller is truly a bad actor, or if the Automated Audio Call ID system incorrectly labeled the caller as bad. This information can then be used to improve the performance of the Automated Audio Call ID system. Another reason to route the call elsewhere is to collect information on malicious callers.

Another embodiment 30 of the "characterization" requires access to carrier records of caller's information. No enrollment is needed with this embodiment. In this embodiment 30, a large database of device and network responses to the pings is stored in a central location. This does not necessarily need to be on enterprise's premises. This database can be housed in the cloud, or locally at a secure location that can be accessed by all enterprise customers who want to use the response system 120. This requires the database to be built up over time by collecting ping data from a wide variety of devices and networks. When a call comes into the response system 120, all information received from the carrier (such as AT&T, Verizon, etc.), plus the ping data is sent to the central location. The enterprise using the response system 120 receives the call and call information and sends an authentication query to the central location. The central location manages queries, processes data, and sends the results back to the enterprise. The returned result of the authentication query may simply be a whether or not the phone number of the caller matches the type of device registered with that number.

Figure 3:
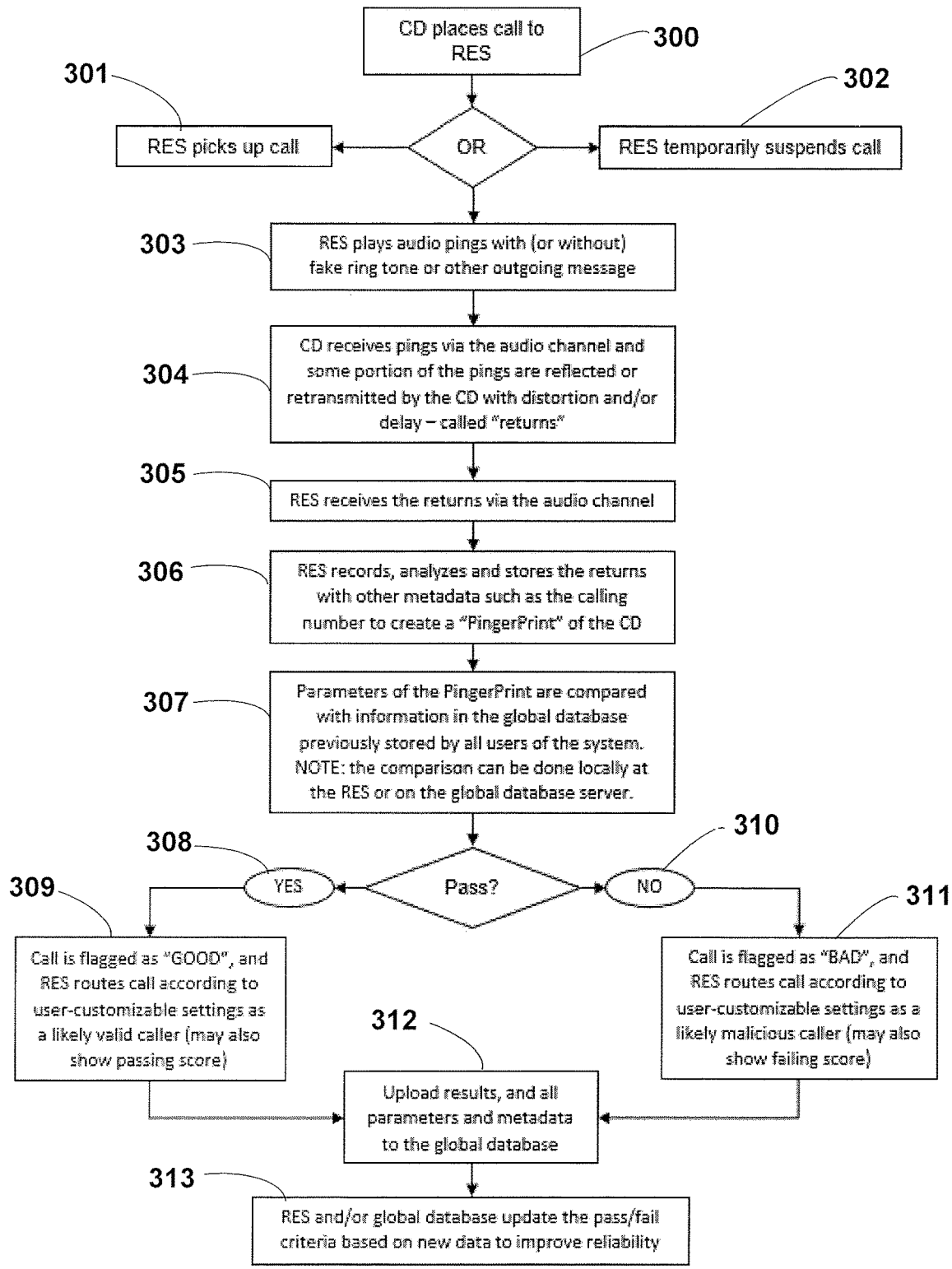
FIG. 3 is a flow diagram depicting a method for authenticating a call without enrollment in an enterprise system.

Turning to FIG. 3, there is shown a flow diagram of an authentication process without enrollment 30. In step 300, a calling device 110 places a call to a response system. In the next step, the response system will either pick up the call (301), temporarily suspend the call (302), or play audio pings with (or without) a fake ring tone or other outgoing message (303). If the response system plays audio pings (303), the next step 304 is the calling device 110 receives pings via the audio channel and some portion of the pings are reflected or retransmitted by the calling device 110 with distortion and/or a delay. The portion of the pings that are reflected or retransmitted is called "returns." In step 305, the response system receives the returns via the audio channel. In step 306, the response system records, analyzes, and stores the returns with other metadata such as the calling number, in order to create a "PingerPrint" of the calling device 110. In step 307, parameters of the PingerPrint are compared with information in the global database previously stored by all users of the response system 120. This step 307 can be completed locally at the response system or on the global database server. If the PingerPrint matches information from the database (308), in the next step 309 the call is flagged as "GOOD," and the response system routes the call according to user-customizable settings as a likely valid caller (may also show passing score). If the PingerPrint does not match information from the database (310), in the next step 311 the call is flagged as "BAD", and the response system routes the call according to user-customizable settings as a likely malicious caller (may also show failing score). The information regarding whether a call is "GOOD" or "BAD" is defined here as "results." After the call is flagged as "GOOD" or "BAD", in the next step 312 the response system uploads the results, all PingerPrint parameters and metadata to the global database. In the next step 313, the response system and/or the global database updates the pass/fail criteria based on the new data to improve reliability.

Both of these embodiments require much the same technology, and data analysis, but they are different in terms of business case, and who owns and maintains the data. Prior to analyzing the data, some pre-processing may be required. This can include things like scaling the waveform to make its amplitude larger, or to match other waveforms; filtering of the signal to remove noise, or unwanted features; truncating part of the signal to remove superfluous audio; dicing up the signal into separate pings before processing; and more. After pre-processing, both time-domain and frequency-domain analysis of the signals is used to produce the PingerPrint of the calling device 110. This takes the form of a numerical score of sorts, that can be easily compared with that of a new call to determine if the new call is likely to be coming from the same device as that of a previously registered caller.

Time-domain analysis looks at the time delay between the ping and its return, the shape of the time envelope of the return, jitter, or any variation in the time between pings and returns, etc. Frequency-domain analysis uses Fourier analysis to examine how the frequency spectrum (including phase) of the return may differ from the outgoing ping, and how it may differ from returns from other devices. Both of these general methods of analysis are powerful, and have pros and cons, as determined at time of implementation of the response system 120.

The response system 120 uses an algorithm or algorithm suite to process the data and create a PingerPrint of each calling device 110. Two very important and related considerations in designing the processing and data analysis algorithms are speed and computational cost. Both need to be minimized in order to create a positive user experience for callers, and a viable product for enterprises that will not be cost prohibitive or limit their call flow. This is one reason why both time and frequency domain analysis methods are evaluated and possibly used together as make sense in the particular implementation. Other analysis methods may also be used, such as some form of statistical analysis.

Another embodiment involves randomizing the pings by changing the order in which they are delivered, or varying the timing, and time spacing between them. This is important in the event that would be hackers figure out how the response system 120 works and try to spoof it by sending out artificial ping returns. Randomizing the pings can help thwart such hacking attempts. In addition, the "active" or useful pings may also be camouflaged with "inactive" pings or other sounds, making it even more difficult for hackers to work out how the response system 120 is working, and what they might try to hack in.

Figure 4:
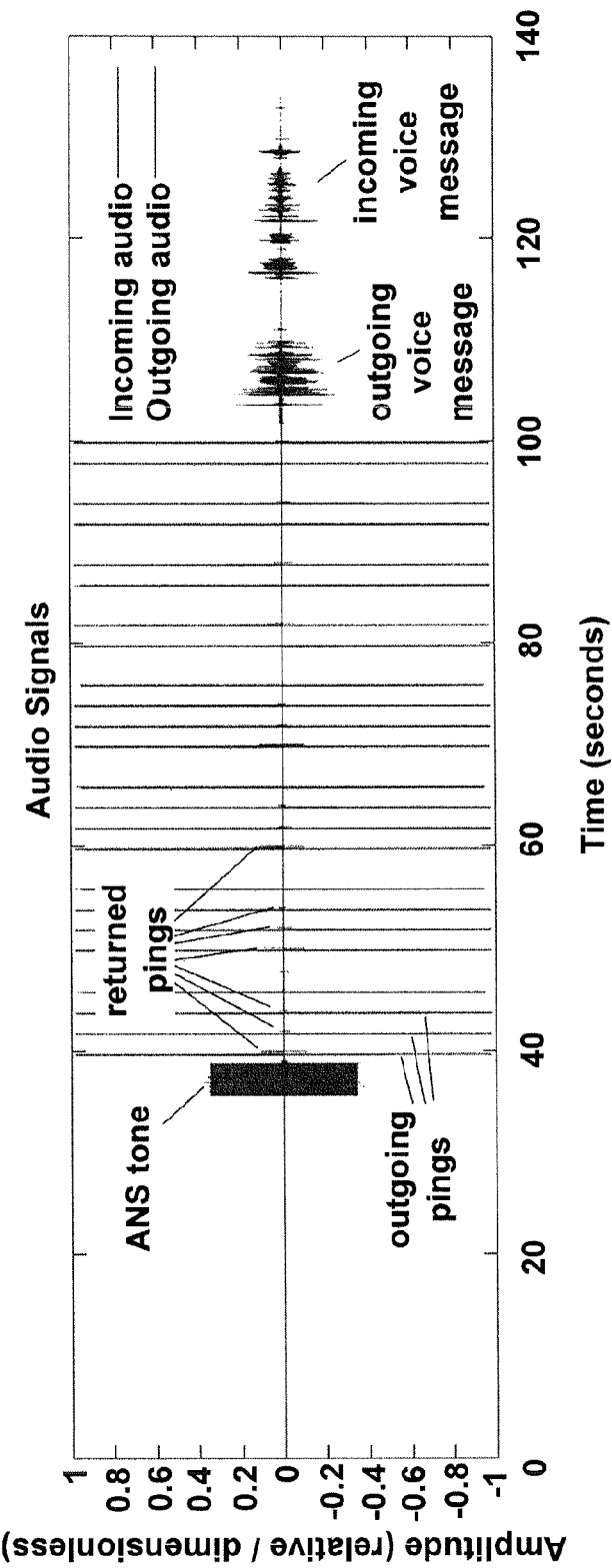
FIG. 4 depicts superimposed plots of both the outgoing and incoming audio during a test call from a landline handset. Pings and returns are visible as sharp vertical bars due to the compressed scale.
Figure 5:
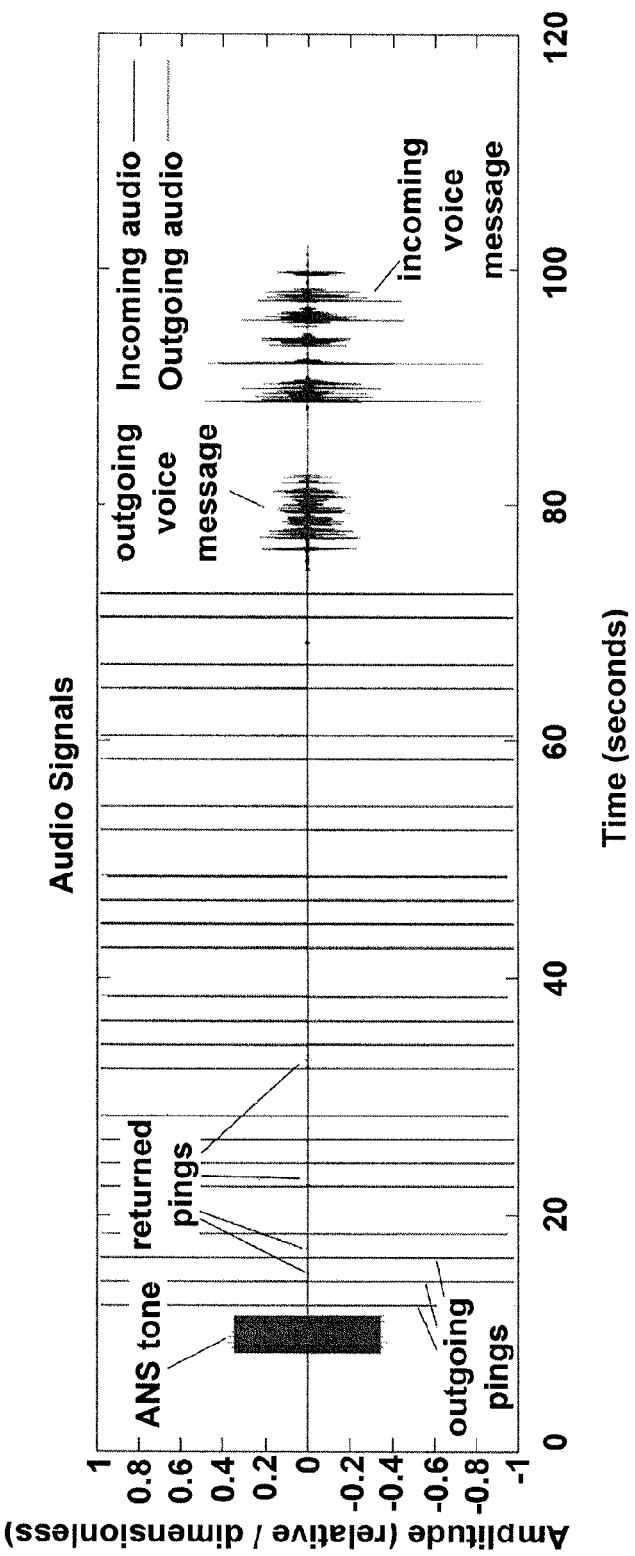
FIG. 5 depicts superimposed plots of both the outgoing and incoming audio during a test call from a cell phone. Outgoing pings #1, #2 and #3 are indicated by the label at the lower left.

FIGS. 4 and 5 are superimposed plots of both the outgoing and incoming audio from one such pair of test calls used during the initialization phase of the implementation of the invention onto a new enterprise calling system. FIG. 4 is for a call from the landline handset, and FIG. 5 is for a cell phone call. The outgoing signal is in blue, and the incoming signal is in red in each of the plots. These plots show the full record, so the waveforms are compressed horizontally since the records are long, but they show the number, relative amplitudes, time gaps and durations of the outgoing and incoming pings. The ANS tone is also seen at the beginning of the call in the outgoing signal, and there are even some returns from the ANS tone in the incoming audio from the landline handset, most likely from the sharp, discontinuous phase shifts in the ANS tone every 450 ms.

Figure 6:
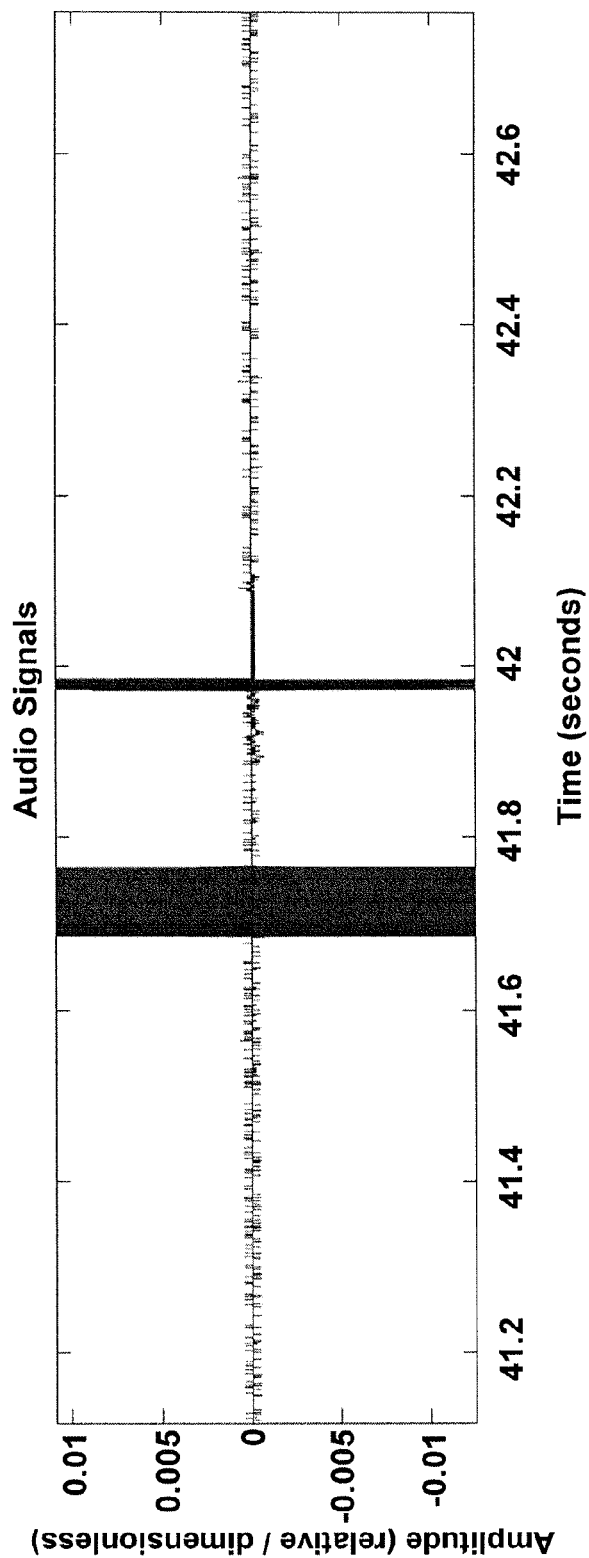
FIG. 6 depicts a zoomed and magnified plot of Ping #2, and its return from the landline test call. The return is received approximately 0.28 sec. after the ping that caused it. This return has sharp rise and cutoff, like the ping, but its duration is significantly shorter than that of the ping.
Figure 7:
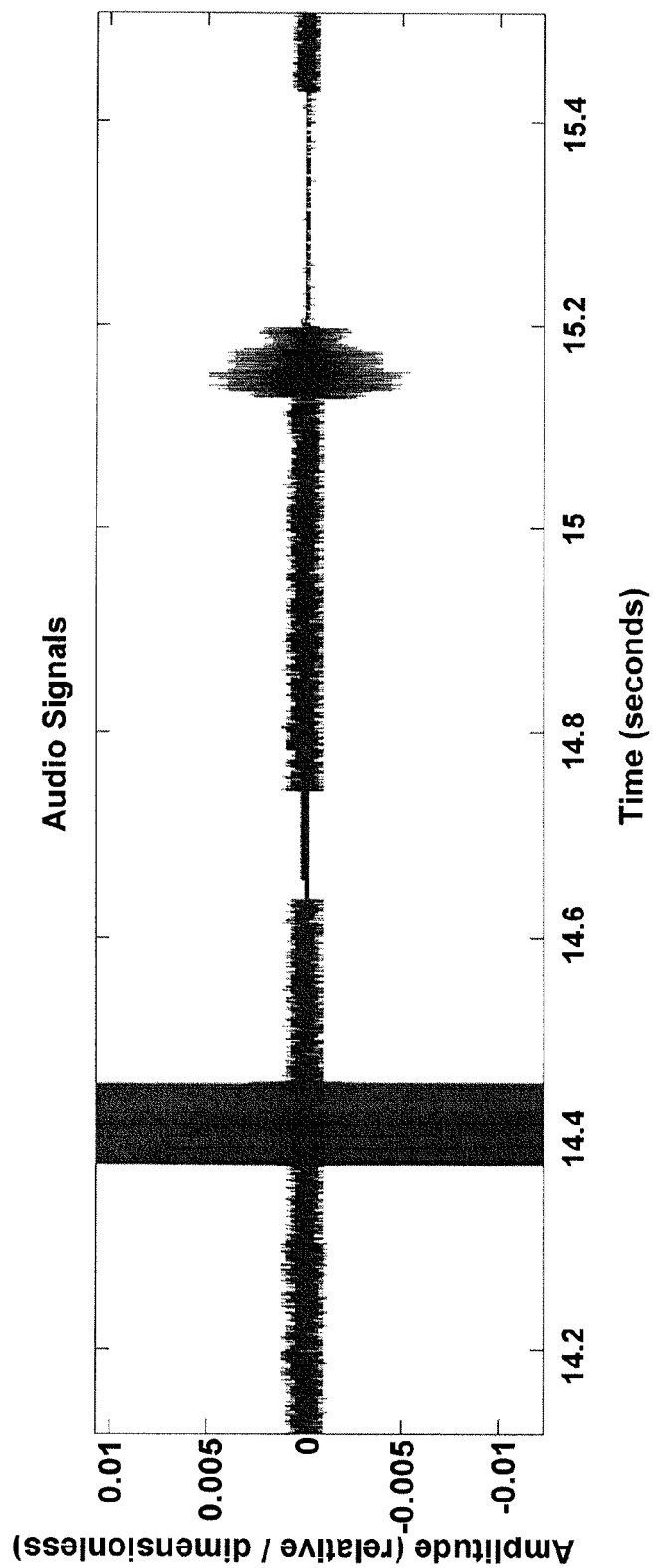
FIG. 7 depicts a zoomed and magnified plot of Ping #2, and its return from the cell phone test call. Now the return arrives approximately 0.76 sec. after the ping. This return is broader, and of much lower amplitude than that of the landline call.

Focusing on the second ping (Ping #2) in this test, and its return, FIGS. 6 and 7 show zoomed-in plots of a 1.5 second (approx.) long window centered between the outgoing ping (in blue) and the return from that ping (in red) for the landline and cell phone test calls respectively. The second ping, shown in these plots is an 80 ms long burst at 500 Hz with a very sharp onset, and cutoff. This is why this ping appears as a rectangular blue block in the plots above. The plots are greatly magnified as well, so peaks are cut off in the vertical axis. These plots show clearly some important differences in the return from the landline versus the cell phone with identical outgoing pings. There is a delay in the return from the landline after receiving the ping of approximately 0.28 seconds, while the return from the cell phone arrives approximately 0.76 seconds after receiving the same ping. Also, it can be clearly seen that the amplitude, duration and time envelope of the returns are also very different between the landline and cell phone. The landline return amplitude from this particular ping is much greater than that from the cell phone, but it is also shorter, and more square in its envelope shape. Despite the low amplitude of the returns, even the weak returns from the cell phone are still quite audible, and also visible in the plots.

Figure 8:
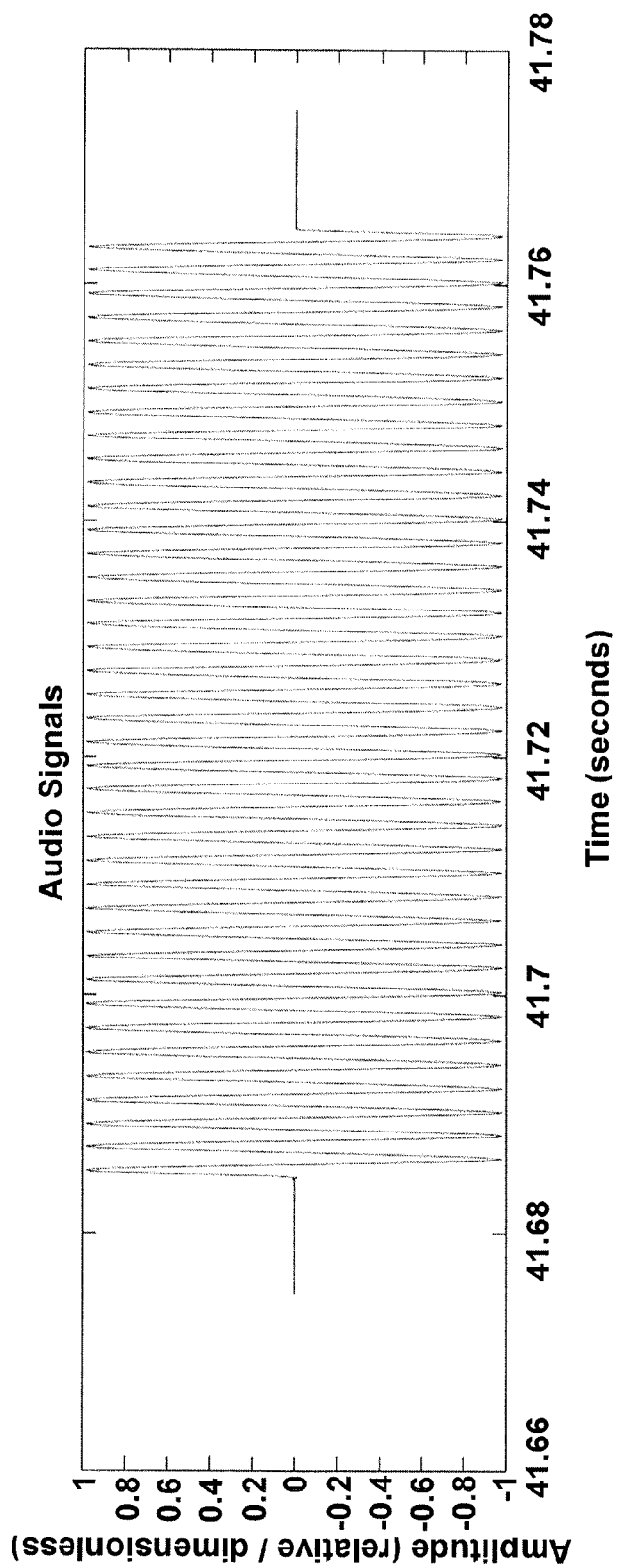
FIG. 8 depicts the waveform of Ping #2.
Figure 9:
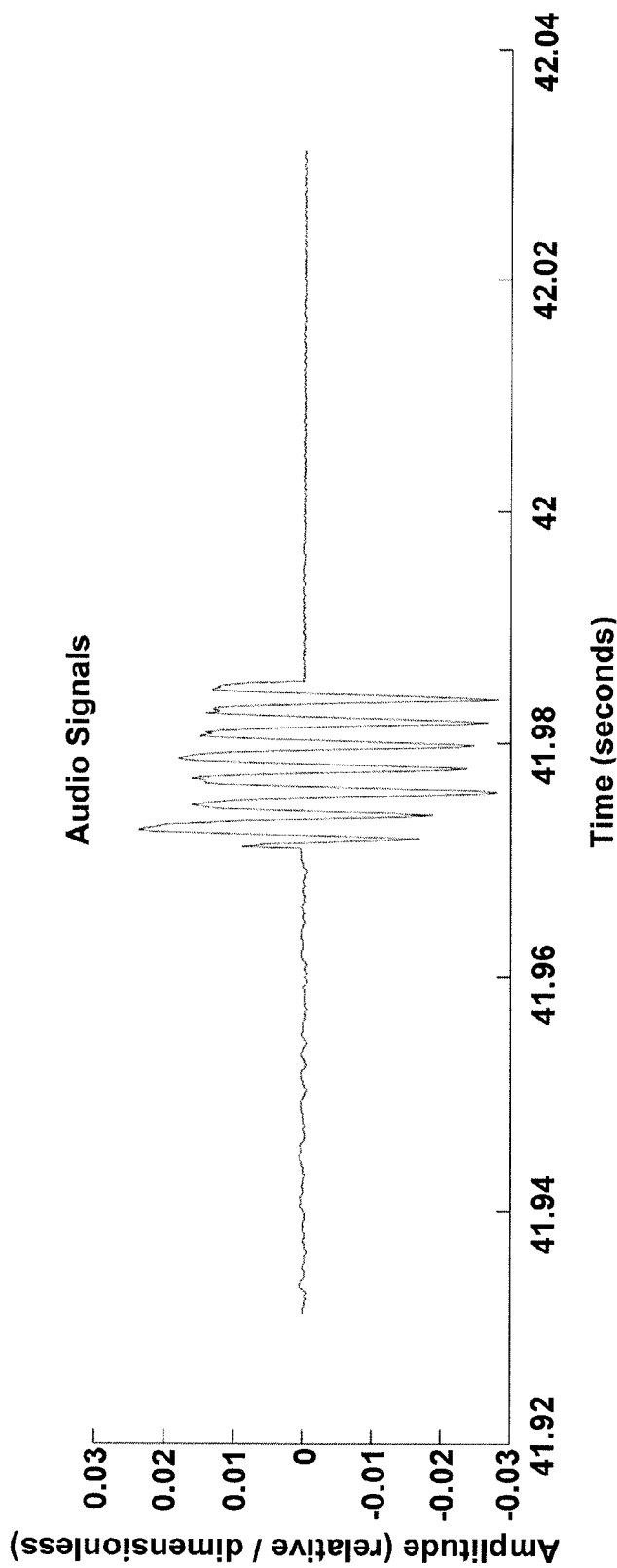
FIG. 9 depicts the return from Ping #2 from the landline test call. Note that the duration of this return is approximately one quarter that of the ping itself.
Figure 10:
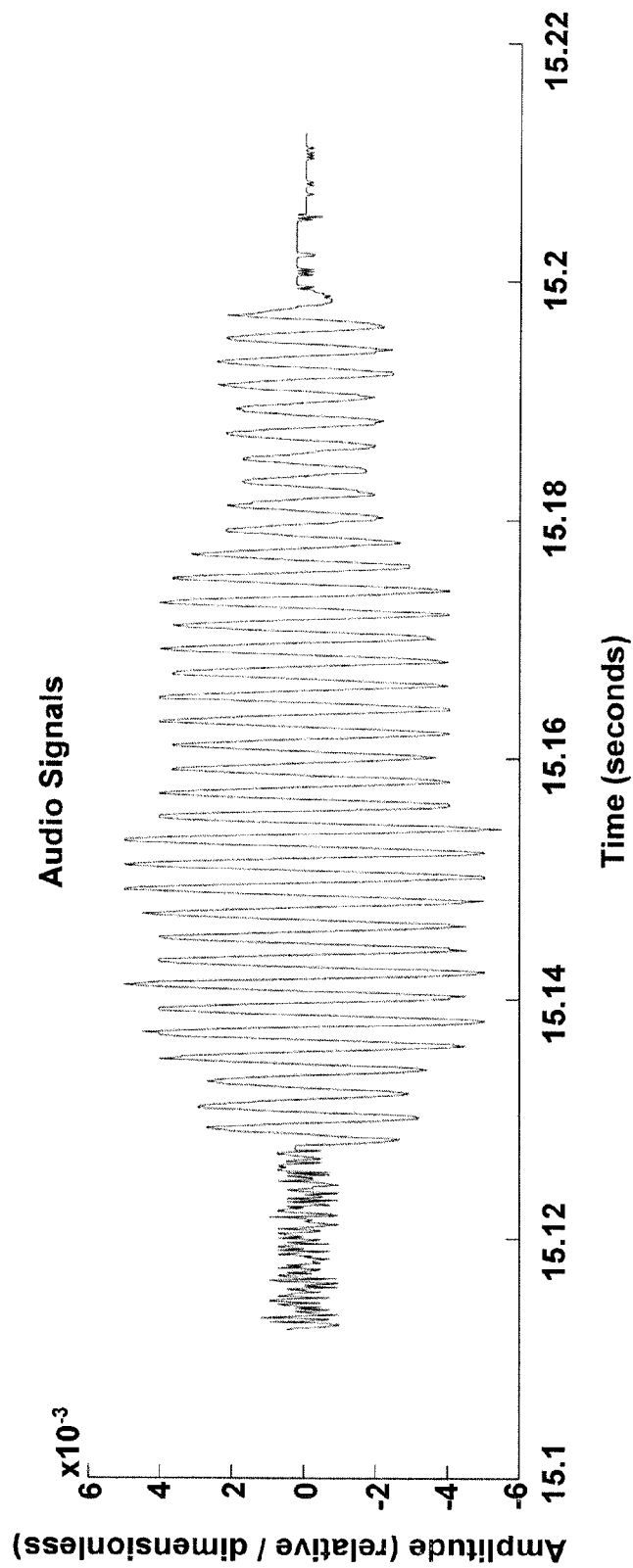
FIG. 10 depicts the return from Ping #2 from the cell phone test call. The duration of this return is much longer than that from the landline, while its amplitude is much less. It also has a notable envelope shape. Some other noise on the line is also visible before and after the envelope.

To clarify the differences between the two returns and help in understanding how this information may be used to characterize the calling device 110, FIGS. 8, 9, and 10 show the outgoing ping #2 waveform, the waveforms of the landline return and cell phone return from ping #2, respectively. Each of these plots shows a segment of the audio waveform that is 100 ms long and centered on the ping or return. The vertical axes are scaled for each differently so the waveform and time envelope of each is clearly visible in the plots.

The differences in the response from the landline handset, and the cell phone, with all other test parameters held constant, is very clear. Repeated calls from the same landline and cell phone produced very similar results, indicating that the characteristics of the returns are related to some combination of the calling device 110, and the network.

The response system 120 starts the initialization phase with relatively simple waveforms and time envelopes tested for the pings. These are very useful in beginning to understand what might work best to probe the calling device 110 in this way. Generally, relatively low frequencies produce more consistent, and stronger returns, however, this may be misleading since it could also have to do with the shape of the time envelope of the ping waveform.

After testing pings with simple waveforms, the response system 120 performs testing with a series of new ping waveforms. These include simpler waveforms at some new frequencies, as well as much more complex waveforms, some of which are a mix of longer, slower-rising envelopes at one frequency with sharp-rising, shorter packets at a different frequency. Tests with more complex waveforms are run, for example waveforms that change their frequency spectrum during their time envelope. These may include pulse waves with a time-varying duty cycle or saw-tooth wave with time-varying frequency. The response system 120 performs the tests to develop pings that produce good returns without the need to pre-condition the line with the ANS tone.

Although the present disclosure has been described in terms of the foregoing disclosed embodiments, this description has been provided by way of explanation only and is not intended to be construed as a limitation of the invention. Even though the foregoing descriptions refer to embodiments that are presently contemplated, those of ordinary skill in the art will recognize many possible alternatives that have not been expressly referenced or even suggested here. While the foregoing written descriptions should enable one of ordinary skill in the pertinent arts to make and use what are presently considered the best modes of the invention, those of ordinary skill will also understand and appreciate the existence of numerous variations, combinations, and equivalents of the various aspects of the specific embodiments, methods, and examples referenced herein.

Hence the drawing and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention, as defined by any claims included herewith or later added or amended in an application claiming priority to this present filing.

Accordingly, in all respects, it should be understood that the drawings and detailed descriptions herein are to be regarded in an illustrative rather than a restrictive manner and are not intended to limit the invention to the particular forms and examples disclosed. Rather, the invention includes all embodiments and methods within the spirit and scope of the invention as claimed, as the claims may be amended, replaced or otherwise modified during the course of related prosecution. Any current, amended, or added claims should be interpreted to embrace all further modifications, changes, rearrangements, substitutions, alternatives, design choices, and embodiments that may be evident to those of skill in the art, whether now known or later discovered. In any case, all substantially equivalent systems, articles, and methods should be considered within the scope of the invention and, absent express indication otherwise, all structural or functional equivalents are anticipated to remain within the spirit and scope of the presently disclosed systems and methods. The invention covers all embodiments within the spirit and scope of such claims, irrespective of whether such embodiments have been remotely referenced here or whether all features of such embodiments are known at the time of this filing.

I claim:

1. A method for authenticating calls with enrollment, the method comprising:
 a) providing a response system, wherein the response system is hosted on a server, and wherein the response system is in electronic communication with a database;
 b) receiving, by the response system, a call from a calling device;
 c) generating audio pings, wherein the audio pings are incorporated into an outgoing message;
 d) transmitting the outgoing message incorporating the audio pings from the response system to the calling device through an audio channel;
 e) reflecting at least a portion of the transmitted audio pings from the calling device back to the response system;
 f) receiving, at the response system, the at least a portion of the retransmitted audio pings through the audio channel;
 g) recording, analyzing, and storing, by the response system, the at least a portion of the retransmitted audio pings along with other metadata to create a PingerPrint of the calling device;
 h) determining, by the response system, whether the PingerPrint of the calling device matches any existing database entries by comparing the PingerPrint with existing database entries previously stored in the database; and i) after determining whether the PingerPrint of the calling device matches a database entry previously stored in the database, routing the call according to user-customizable settings.

2. The method of claim 1, further comprising enrollment, wherein the response system, upon comparing the PingerPrint with existing database entries, determines that the PingerPrint of the calling device does not match any database entries and the call from the calling device is determined to be a first-time caller, then automatically storing the PingerPrint of the calling device in the database as a new enrollment.

3. The method of claim 1, further comprising enrollment updating, wherein the response system, upon comparing the PingerPrint with existing database entries, determines that the PingerPrint of the calling device does not match any database entries and the call from the calling device is determined to not be a first-time caller, then adding the PingerPrint of the calling device to the existing database entries.

4. The method of claim 1, wherein the comparison of the PingerPrint of the calling device with existing database entries is performed locally by the response system.

5. The method of claim 1, wherein the comparison of the PingerPrint of the calling device with existing database entries is performed on a global database server.

6. The method of claim 1, wherein a portion of the response system is cloud-hosted on a server.

7. The method of claim 1, wherein the at least a portion of the transmitted audio pings reflected back to the response system further comprises distortion and/or delay.

8. A system for authenticating calls, the system comprising:
   a) a response system hosted on a server, wherein the response system is in electronic communication with a database; and
   b) a calling device configured for placing a call;
   c) wherein the response system is configured to perform a method of authenticating the calling device, the steps of the method comprising:
      1) receiving, by the response system, a call from the calling device;
      2) generating audio pings, wherein the audio pings are incorporated into an outgoing message;
      3) transmitting the outgoing message incorporating the audio pings from the response system to the calling device through an audio channel;
      4) reflecting at least a portion of the transmitted audio pings from the calling device back to the response system;
      5) recording, analyzing, and storing, by the response system, the at least a portion of the retransmitted audio pings along with other metadata to create a PingerPrint of the calling device;
      6) determining, by the response system, whether the PingerPrint of the calling device matches any existing database entries by comparing the PingerPrint with existing database entries previously stored in the database; and
      7) after determining whether the PingerPrint of the calling device matches a database entry previously stored in the database, routing the call according to user-customizable settings.

9. The system of claim 8, wherein the response system, upon comparing the PingerPrint with existing database entries, determines that the PingerPrint of the calling device does not match any database entries and the call from the calling device is determined to not be a first-time caller, then adding the PingerPrint of the calling device to the existing database entries.

10. The system of claim 8, wherein the response system, upon comparing the PingerPrint with existing database entries, determines that the PingerPrint of the calling device does not match any database entries and the call from the calling device is determined to not be a first-time caller, then adding the PingerPrint of the calling device to the existing database entries.

11. The system of claim 8, wherein the comparison of the PingerPrint of the calling device with existing database entries is performed locally by the response system.

12. The system of claim 8, wherein the comparison of the PingerPrint of the calling device with existing database entries is performed on a global database server.

13. The system of claim 8, wherein a portion of the response system is cloud-hosted on a server.

14. The system of claim 8, wherein the at least a portion of the transmitted audio pings reflected back to the response system further comprises distortion and/or delay.

* * * * *